United States Patent
McLean

(10) Patent No.: US 9,141,809 B2
(45) Date of Patent: Sep. 22, 2015

(54) METHOD AND APPARATUS FOR DETERRING A TIMING-BASED GLITCH ATTACK DURING A SECURE BOOT PROCESS

(75) Inventor: Ivan McLean, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 260 days.

(21) Appl. No.: 13/555,990

(22) Filed: Jul. 23, 2012

(65) Prior Publication Data

US 2014/0025960 A1  Jan. 23, 2014

(51) Int. Cl.
G06F 11/30 (2006.01)
G06F 21/60 (2013.01)
G06F 21/57 (2013.01)
G06F 21/71 (2013.01)

(52) U.S. Cl.
CPC .............. *G06F 21/60* (2013.01); *G06F 21/575* (2013.01); *G06F 21/71* (2013.01)

(58) Field of Classification Search
None
See application file for complete search history.

(56) References Cited

U.S. PATENT DOCUMENTS

| | | | |
|---|---|---|---|
| 5,944,833 A | 8/1999 | Ugon | |
| 6,061,449 A * | 5/2000 | Candelore et al. | 380/28 |
| 7,318,145 B1 | 1/2008 | Stribaek et al. | |
| 2003/0084336 A1* | 5/2003 | Anderson et al. | 713/200 |
| 2003/0200489 A1* | 10/2003 | Hars | 714/703 |
| 2006/0129848 A1* | 6/2006 | Paksoy et al. | 713/193 |
| 2008/0086780 A1* | 4/2008 | Chen et al. | 726/27 |
| 2008/0086781 A1* | 4/2008 | Rodgers | 726/34 |
| 2011/0154032 A1* | 6/2011 | Mauro, II | 713/165 |
| 2012/0060039 A1* | 3/2012 | Leclercq | 713/189 |
| 2012/0210113 A1* | 8/2012 | Wood et al. | 713/2 |
| 2013/0279689 A1* | 10/2013 | Obaidi | 380/28 |
| 2014/0047229 A1* | 2/2014 | Wiseman | 713/2 |

FOREIGN PATENT DOCUMENTS

WO  WO-0155821 A2  8/2001

OTHER PUBLICATIONS

Ghavami, et al., "An EDA tool for implementation of low power and secure crypto-chips," Computers & Electrical Engineering, 35(2), Oct. 11, 2008 pp. 244-257.

Kim, et al., "Fault attacks on RSA-CRT: new attacks, new results, and new countermeasures," Proceedings from Information Security Theory and Practices: Smart Cards, Mobile and Ubiquitous Computing Systems. First IFIP TC6/WG8.8/WG 11.2 International Workshop, WISTP 2007. Lecture Notes in Computer Science, May 10, 2007; 4462, 215-28.

(Continued)

*Primary Examiner* — Jason K. Gee
*Assistant Examiner* — Olanrewaju Bucknor
(74) *Attorney, Agent, or Firm* — Won Tae C. Kim

(57) ABSTRACT

Disclosed is a method for deterring a timing-based glitch attack during a secure boot process of a device having a device-specific number. In the method, the device generates a pseudorandom number specific to a particular execution of a secure boot process. The device combines the device-specific number and the pseudorandom number to generate a diversity value. The device may change a timing of at least one process step of the secure boot process based on the diversity value. Also, the device may change an order of process steps of the secure boot process based on the diversity value.

28 Claims, 5 Drawing Sheets

(56) References Cited

OTHER PUBLICATIONS

Moore, et al., "Balanced self-checking asynchronous logic for smart card applications," Microprocessors and Microsystems, 27(9), Apr. 26, 2003; pp. 421-430.
Peterson, "Developing tamper resistant designs with Xilinx Virtex-6 and 7 series FPGAs," Xilinx, XAPP1084 (v1.1), Dec. 1, 2011, pp. 1-18.
Bar-El H., et al., "The Sorcerer's Apprentice Guide to Fault Attacks", Internet Citation, May 7, 2004, XP002329915, [retrieved on May 27, 2005].
International Search Report and Written Opinion—PCT/US2013/051717—ISA/EPO—Nov. 28, 2013.
Kommerling O., et al., "Design Principles for Tamper-Resistant Smartcard Processors," Usenix Workshop on Smartcard Technology, Smartcard '99 Conference, May 10-11, 1999, 13 pages.

* cited by examiner

METHOD AND APPARATUS FOR DETERRING A TIMING-BASED GLITCH ATTACK DURING A SECURE BOOT PROCESS

BACKGROUND

1. Field

The present invention relates generally to deterring a timing-based glitch attack during a secure boot process.

2. Background

A glitch attack is a widely used attack against highly secure platforms. A glitch may be achieved by a very precise, malicious modification of power or timing inputs to a platform's processor or external memory. Typically, the modification is a tiny pulse sent to the processor or memory by a "mod chip." The intent is to change the execution path of the code, typically skipping over or subverting a critical check or validation step.

Generally, an attacker's objectives are: 1) to create an attack that is easily repeatable on a given device; 2) to create an attack that propagates and can be commoditized and commercialized (enabling the creation of cheap, easy to install mod chips); and 3) to break the chain of trust as early as possible (rooting or owning the device).

Once a glitch attack has been perfected against one device, it may be used against every device having the same configuration. Glitch attacks are almost always against secure boot—the code or logic that establishes the root of trust on the device very early on in the boot process. The attraction of attacking secure boot is that once it is compromised, all of the security on the device typically collapses.

There is therefore a need for a technique for deterring a glitch attack during a secure boot process.

SUMMARY

An aspect of the invention may reside in a method for deterring a timing-based glitch attack during a secure boot process of a device having a device-specific number. In the method, the device generates a pseudorandom number specific to a particular execution of a secure boot process. The device combines the device-specific number and the pseudorandom number to generate a diversity value. The device changes a timing of at least one process step of the secure boot process based on the diversity value.

In more detailed aspects of the invention, the device-specific number may be a serial number or a securely stored device-specific key. The device may cryptographically combine the device-specific key and the pseudorandom number to generate the diversity value. Also, the device may change an order of process steps of the secure boot process based on the diversity value.

Another aspect of the invention may reside in an apparatus with a device-specific number, comprising: means for generating a pseudorandom number specific to a particular execution of a secure boot process; means for combining the device-specific number and the pseudorandom number to generate a diversity value; and means for changing a timing of at least one process step of the secure boot process based on the diversity value.

Another aspect of the invention may reside in an apparatus with a device-specific number, comprising: a processor configured to: generate a pseudorandom number specific to a particular execution of a secure boot process; combine the device-specific number and the pseudorandom number to generate a diversity value; and change a timing of at least one process step of the secure boot process based on the diversity value.

Another aspect of the invention may reside in a computer program product, comprising: computer-readable medium, comprising: code for causing a computer to generate a pseudorandom number specific to a particular execution of a secure boot process; code for causing a computer to combine a device-specific number and the pseudorandom number to generate a diversity value; and code for causing a computer to change a timing of at least one process step of the secure boot process based on the diversity value.

Yet another aspect of the invention may reside in another method for deterring a timing-based glitch attack during a secure boot process of a device having a device-specific number. In the method, the device generates a pseudorandom number specific to a particular execution of a secure boot process; the device combines the device-specific number and the pseudorandom number to generate a diversity value; and the device changes an order of process steps of the secure boot process based on the diversity value.

In more detailed aspects of the invention, the device-specific number may be a serial number or a securely stored device-specific key. The device may cryptographically combine the device-specific key and the pseudorandom number to generate the diversity value.

Another aspect of the invention may reside in an apparatus with a device-specific number, comprising: means for generating a pseudorandom number specific to a particular execution of a secure boot process; means for combining the device-specific number and the pseudorandom number to generate a diversity value; and means for changing an order of process steps of the secure boot process based on the diversity value.

Another aspect of the invention may reside in an apparatus with a device-specific number, comprising: a processor configured to: generate a pseudorandom number specific to a particular execution of a secure boot process; combine the device-specific number and the pseudorandom number to generate a diversity value; and change an order of process steps of the secure boot process based on the diversity value.

Another aspect of the invention may reside in a computer program product, comprising: computer-readable medium, comprising: code for causing a computer to generate a pseudorandom number specific to a particular execution of a secure boot process; code for causing a computer to combine a device-specific number and the pseudorandom number to generate a diversity value; and code for causing a computer to change an order of process steps of the secure boot process based on the diversity value.

DETAILED DESCRIPTION

Figure 1:
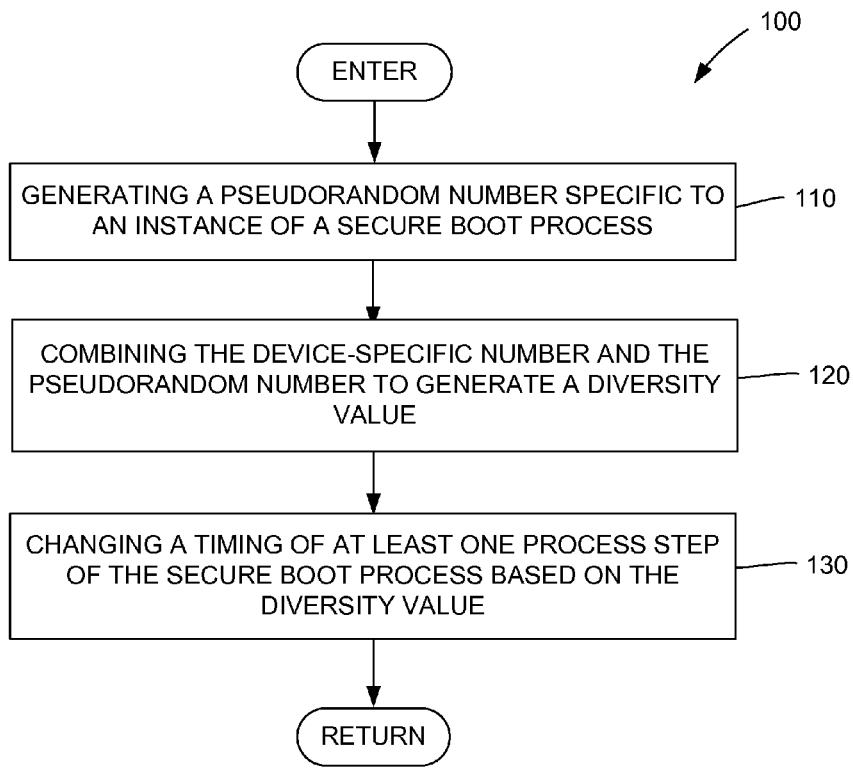
FIG. 1 is a flow diagram of a method for deterring a timing-based glitch attack during a secure boot process, according to the present invention.

The word "exemplary" is used herein to mean "serving as an example, instance, or illustration." Any embodiment described herein as "exemplary" is not necessarily to be construed as preferred or advantageous over other embodiments.

With reference to FIGS. 1-4, an aspect of the invention may reside in a method 100 for deterring a timing-based glitch attack during a secure boot process 300 of a device 400 having a device-specific number 200. In the method, the device generates a pseudorandom number 210 specific to a particular execution of a secure boot process (step 110). The device combines the device-specific number and the pseudorandom number to generate a diversity value 220 (step 120). The device changes a timing $T_N$ of at least one process step $PS_N$ of the secure boot process based on the diversity value.

Figure 3A:
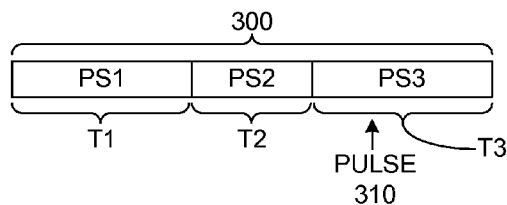
FIGS. 3A-3E are schematic diagrams of process steps of a secure boot process.
Figure 3B:
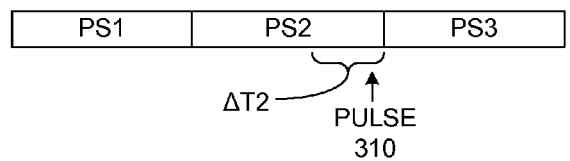
Figure 3C:
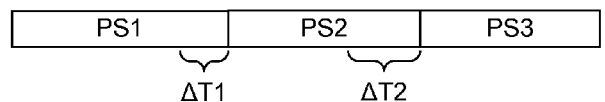

FIG. 3A shows a simplified view of the process steps $PS_N$ performed during a secure boot process 300 of the device 400. Three process steps, PS1, PS2 and PS3, each have an associated timing, e.g., T1, T2 and T3, for the start and/or execution time of the respective process step. As an example, a glitch attack may be effective when a pulse 310 is applied at particular time during the third process step PS3. However, the execution time of the second process step may be increased, or the start time of the third process step may be delayed. Such change in the timing of a process step may be based on the diversity value as shown by the timing difference ΔT2. As an example, the diversity value may define a delay time before, during, or at the end of the second process step PS2. The delay time Td may be derived as a function of the diversity value DV and a scaling factor S, as an example, according to the equation: Td=f(DV*S). The number of bits representing the diversity value may be reduced using a hash function or a modulo (mod) function. The scaling factor may adjust the delay time, in accordance with the clock speed of the processor executing the boot process, to allow the delay time to fall within an effective range. As shown in FIG. 3B, this timing difference may cause the pulse 310 to be ineffectively applied during the second process step PS2, rendering the glitch attack useless. FIG. 3C shows that several timing changes, ΔT1 and ΔT2, may be made to more than one process step. Thus, the present invention offers a defense against glitch attacks through diversity because every device behaves differently on every particular execution, boot cycle, or instance, of the secure boot process.

Figure 2:
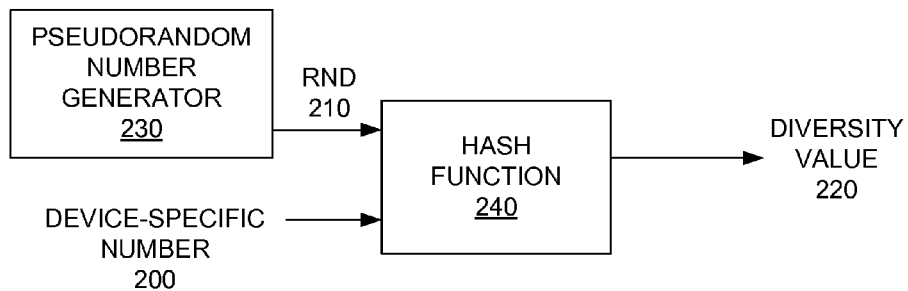
FIG. 2 is a schematic diagram showing the generation of a diversity value from a device-specific number and a pseudorandom number.

In more detailed aspects of the invention, the device-specific number 200 may be a serial number or a securely stored device-specific key. The device 400 may cryptographically combine the device-specific key and the pseudorandom number 210 to generate the diversity value 220. Although a hash function 240 is shown in FIG. 2, other cryptographic functions may be used to combine the device-specific number and the pseudorandom number to generate the diversity value.

Figure 3D:
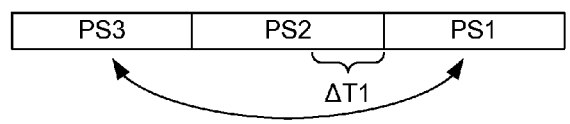
Figure 3E:
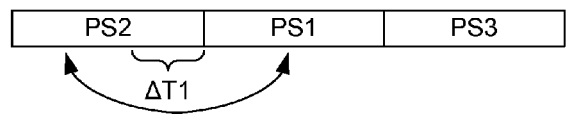
Figure 4:
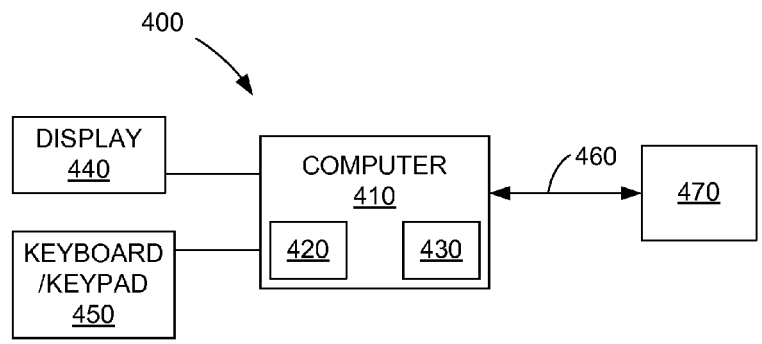
FIG. 4 is a block diagram showing an example of a computer for implementing the methods.

Also, as shown in FIGS. 3D and 3E, the device may change an order of process steps $PS_N$ of the secure boot process 300 based on the diversity value 220. For example, in FIG. 3D, the order of the first and third process steps, PS1 and PS3, may be swapped based on whether the diversity value is odd or even. In FIG. 3D, the order of the first and second process steps, PS1 and PS2, may be swapped based on the diversity value.

The generated diversity value 220 or data may be used to drive relatively small but significant changes to both the control flow and timing of the secure boot process 300. For example, small delays may be added to one or more process steps $PS_N$ based on the diversity value, or the order of certain operations or routines may be switched around. Critical checks may be repeated any number of times based on this output. These changes may make it very difficult for the attacker to craft a reliable attack against a single device 400. It also may make it even more difficult to propagate a successful attack to other devices, since the attacker would not be able to reliably predict when to inject the glitch. Thus, differences in timing may make it difficult to create a repeatable attack. Also, differences in logic flow may make it difficult to make any predictions about the randomized timing based on, for example, side channel information such as power fluctuations.

In order to create the small differences in the timing and/or the logic flow of the secure boot implementation, a secure source of entropy is needed. One source may include a random number RAN 210 generated by a hardware-based random number generator 230 incorporated into the device 400. Alternatively, a pseudorandom number generator may be implemented by the processor 420 with entropy based on a hardware event or aspect, etc. The output of the random number generator may not need to be "crypto quality". In order to enhance the diversity between devices/chips, unique secret keys, protected state, or serialization information may be mixed in with the output of the random number generator. As a result, diversity is leveraged in order to offer protection against physical glitch attacks during secure boots of a device.

The device 400 (or a station) may be a computer 410 that includes a processor 420, memory 430 (and/or disk drives), a display 440, and keypad or keyboard 450. The computer may also include a microphone, speaker(s), camera, and the like. Further, the device may also include USB, Ethernet and similar interfaces, for communicating over a network 460, such as the internet, with other devices and/or servers 470.

Another aspect of the invention may reside in an apparatus 400 with a device-specific number 200, comprising: means 420 for generating a pseudorandom number 210 specific to a particular execution of a secure boot process 300; means 420 for combining the device-specific number and the pseudorandom number to generate a diversity value 220; and means 420 for changing a timing $T_N$ of at least one process step $PS_N$ of the secure boot process based on the diversity value.

Another aspect of the invention may reside in an apparatus 400 with a device-specific number 200, comprising: a processor 400 configured to: generate a pseudorandom number 210 specific to a particular execution of a secure boot process 300; combine the device-specific number and the pseudorandom number to generate a diversity value 220; and change a timing $T_N$ of at least one process step $PS_N$ of the secure boot process based on the diversity value.

Another aspect of the invention may reside in a computer program product, comprising: non-transitory computer-readable medium 430, comprising: code for causing a computer 410 to generate a pseudorandom number 210 specific to a particular execution of a secure boot process 300; code for causing a computer 410 to combine a device-specific number 200 and the pseudorandom number to generate a diversity value 220; and code for causing a computer 410 to change a timing $T_N$ of at least one process step $PS_N$ of the secure boot process based on the diversity value.

Figure 5:
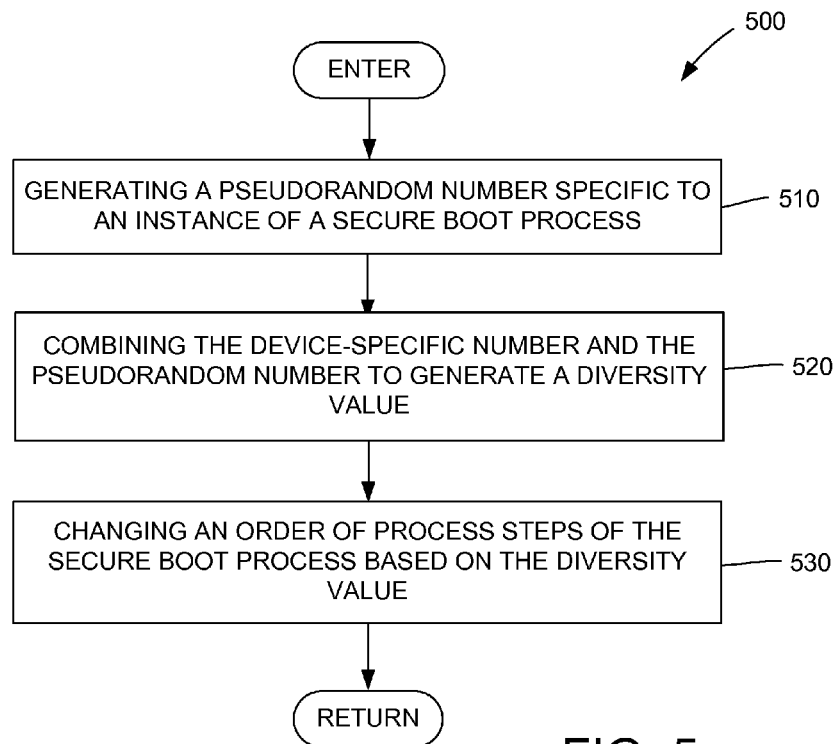
FIG. 5 is a flow diagram of another method for deterring a timing-based glitch attack during a secure boot process, according to the present invention.
Figure 6A:
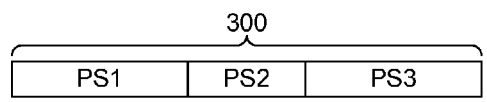
FIGS. 6A-6B are schematic diagrams of process steps of a secure boot process.
Figure 6B:
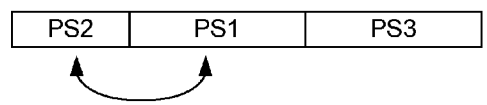

With further reference to FIGS. 5 and 6, yet another aspect of the invention may reside in another method 500 for deterring a timing-based glitch attack during a secure boot process 300 of a device 400 having a device-specific number 200. In the method, the device generates a pseudorandom number 210 specific to a particular execution of a secure boot process 300 (step 510). The device combines the device-specific number and the pseudorandom number to generate a diversity value 220 (step 520). The device changes an order of process steps, e.g., PS1 and PS2, of the secure boot process based on the diversity value (step 530), as shown in FIGS. 6A and 6B.

In more detailed aspects of the invention, the device-specific number 200 may be a serial number or a securely stored device-specific key. The device 400 may cryptographically combine the device-specific key and the pseudorandom number 210 to generate the diversity value 220.

Another aspect of the invention may reside in an apparatus 400 with a device-specific number 200, comprising: means 420 for generating a pseudorandom number 210 specific to a particular execution of a secure boot process; means 420 for combining the device-specific number and the pseudorandom number to generate a diversity value 220; and means 420 for changing an order of process steps, e.g., PS1 and PS2, of the secure boot process based on the diversity value.

Another aspect of the invention may reside in an apparatus 400 with a device-specific number 200, comprising: a processor 420 configured to: generate a pseudorandom number 210 specific to a particular execution of a secure boot process 300; combine the device-specific number and the pseudorandom number to generate a diversity value 220; and change an order of process steps, e.g., PS1 and PS2, of the secure boot process based on the diversity value.

Another aspect of the invention may reside in a computer program product, comprising: non-transitory computer-readable medium 430, comprising: code for causing a computer 410 to generate a pseudorandom number 210 specific to a particular execution of a secure boot process 300; code for causing a computer 410 to combine a device-specific number 200 and the pseudorandom number 210 to generate a diversity value 220; and code for causing a computer 410 to change an order of process steps, e.g., PS1 and PS2, of the secure boot process based on the diversity value being odd or even, i.e., the diversity value mod 2.

Figure 7:
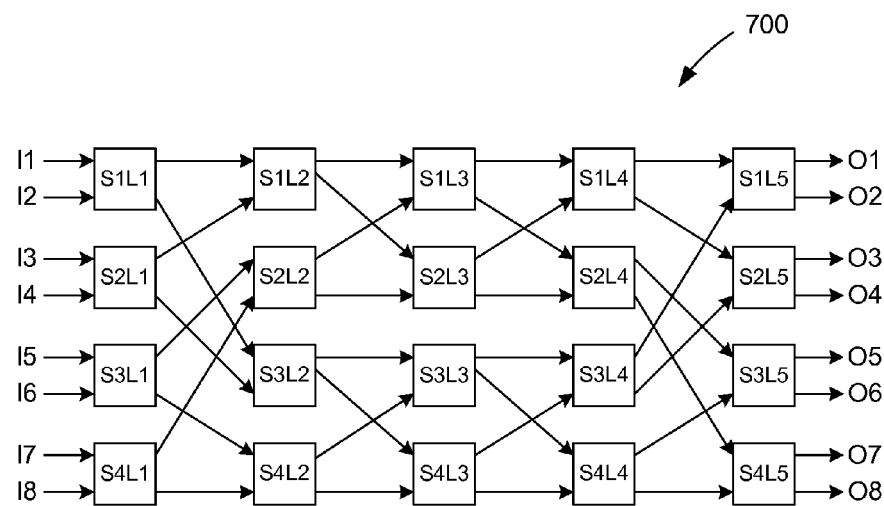
FIG. 7 is a schematic diagram of a network for re-ordering process steps of a secure boot process.

With reference to FIG. 7, a Benes Network 700 may be used to re-order the execution of the process steps of the secure boot process 300. The process steps that can be run in any order may be identified. Although 20 to 100 or more process steps may be identified for re-ordering, as an example, 8 distinct process steps are shown in FIG. 7. The 8 process steps are assigned an identifying number and are represented by the 8 inputs I1-I8 (two inputs for each of the four input level switches S1L1-S4L1) on the left side of the Benes Network. Each box in the Benes Network has two inputs and re-routes the inputs based on the value of a single bit (0 or 1). In the example, the Benes Network has 5 levels (L1-L5) of 4 switches (S1-S4), after which the output order is established. 20 bits are needed to set the 5 levels of 4 switches at each level that form the Benes Network. The 20 bits may be selected from the 20 least significant bits (LSBs) of a hash of the diversity value. The order of the 8 identified/selected process steps would be different for each particular execution of the boot process because the diversity value used for generating the 20 bits for setting the switches is different for each specific execution of the boot process.

Figure 8:
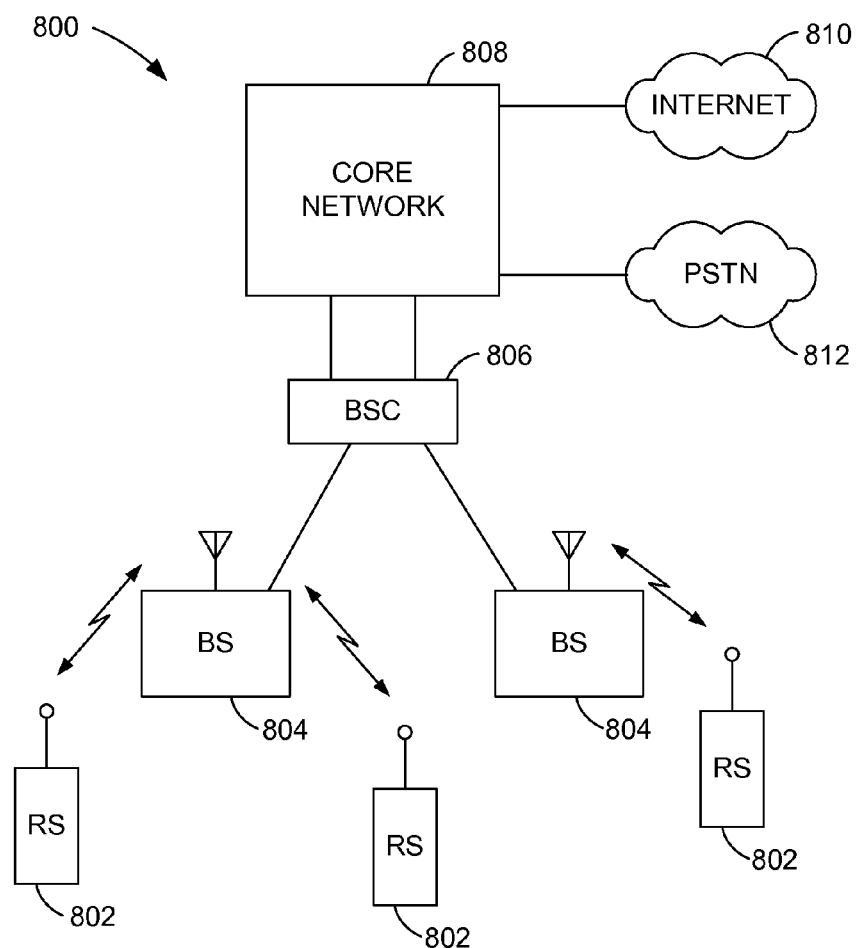
FIG. 8 is a block diagram of an example of a wireless communication system.

With reference to FIG. 8, a wireless remote station (RS) 802 (user equipment UE and/or device 400) may communicate with one or more base stations (BS) 804 of a wireless communication system 800. The RS may further pair with a wireless peer device. The wireless communication system 800 may further include one or more base station controllers (BSC) 806, and a core network 808. Core network may be connected to an Internet 810 and a Public Switched Telephone Network (PSTN) 812 via suitable backhauls. A typical wireless mobile station may include a handheld phone, or a laptop computer. The wireless communication system 800 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on as one or more instructions or code on a computer-readable medium. Computer-readable media includes computer storage media that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer-readable medium may be non-transitory such that it does not include a transitory, propagating signal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for deterring a timing-based glitch attack during a secure boot process of a device having a device-specific number, comprising:
    generating, by the device, a pseudorandom number specific to a particular execution of a secure boot process;
    cryptographically combining, by the device, the device-specific number and the pseudorandom number to generate a diversity value; and
    changing, by the device, a timing of at least one process step of the secure boot process based on the diversity value.

2. A method as defined in claim 1, wherein the device-specific number comprises a securely stored device-specific key.

3. A method as defined in claim 1, wherein the device-specific number comprises a serial number.

4. A method as defined in claim 1, further comprising:
    changing, by the device, an order of process steps of the secure boot process based on the diversity value.

5. An apparatus with a device-specific number, comprising:
    means for generating a pseudorandom number specific to a particular execution of a secure boot process;
    means for cryptographically combining the device-specific number and the pseudorandom number to generate a diversity value; and
    means for changing a timing of at least one process step of the secure boot process based on the diversity value.

6. An apparatus as defined in claim 5, wherein the device-specific number comprises a securely stored device-specific key.

7. An apparatus as defined in claim 5, wherein the device-specific number comprises a serial number.

8. An apparatus as defined in claim 5, further comprising:
    means for changing an order of process steps of the secure boot process based on the diversity value.

9. An apparatus with a device-specific number, comprising:
    a hardware processor configured to:
    generate a pseudorandom number specific to a particular execution of a secure boot process;
    cryptographically combine the device-specific number and the pseudorandom number to generate a diversity value, and
    change a timing of at least one process step of the secure boot process based on the diversity value.

10. An apparatus as defined in claim 9, wherein the device-specific number comprises a securely stored device-specific key.

11. An apparatus as defined in claim 9, wherein the device-specific number comprises a serial number.

12. An apparatus as defined in claim 9, wherein the processor is further configured to:
    change an order of process steps of the secure boot process based on the diversity value.

13. A computer program product, comprising:
    non-transitory computer-readable medium, comprising:
    code for causing a computer to generate a pseudorandom number specific to a particular execution of a secure boot process;
    code for causing a computer to cryptographically combine a device-specific number and the pseudorandom number to generate a diversity value; and
    code for causing a computer to change a timing of at least one process step of the secure boot process based on the diversity value.

14. A computer program product as defined in claim 13, wherein the device-specific number comprises a securely stored device-specific key.

15. A computer program product as defined in claim 13, wherein the device-specific number comprises a serial number.

16. A computer program product as defined in claim 13, wherein the non-transitory computer-readable medium further comprises:
    code for causing a computer to change an order of process steps of the secure boot process based on the diversity value.

17. A method for deterring a timing-based glitch attack during a secure boot process of a device having a device-specific number, comprising:
    generating, by the device, a pseudorandom number specific to a particular execution of a secure boot process;
    cryptographically combining, by the device, the device-specific number and the pseudorandom number to generate a diversity value; and
    changing, by the device, an order of process steps of the secure boot process based on the diversity value.

18. A method as defined in claim 17, wherein the device-specific number comprises a securely stored device-specific key.

19. A method as defined in claim 17, wherein the device-specific number comprises a serial number.

20. An apparatus with a device-specific number, comprising:
    means for generating a pseudorandom number specific to a particular execution of a secure boot process;
    means for cryptographically combining the device-specific number and the pseudorandom number to generate a diversity value; and means for changing an order of process steps of the secure boot process based on the diversity value.

21. An apparatus as defined in claim 20, wherein the device-specific number comprises a securely stored device-specific key.

22. An apparatus as defined in claim 20, wherein the device-specific number comprises a serial number.

23. An apparatus with a device-specific number, comprising:
  a hardware processor configured to:
    generate a pseudorandom number specific to a particular execution of a secure boot process;
    cryptographically combine the device-specific number and the pseudorandom number to generate a diversity value, and
    change an order of process steps of the secure boot process based on the diversity value.

24. An apparatus as defined in claim 23, wherein the device-specific number comprises a securely stored device-specific key.

25. An apparatus as defined in claim 23, wherein the device-specific number comprises a serial number.

26. A computer program product, comprising:
  non-transitory computer-readable medium, comprising:
    code for causing a computer to generate a pseudorandom number specific to a particular execution of a secure boot process;
    code for causing a computer to cryptographically combine a device-specific number and the pseudorandom number to generate a diversity value; and
    code for causing a computer to change an order of process steps of the secure boot process based on the diversity value.

27. A computer program product as defined in claim 26, wherein the device-specific number comprises a securely stored device-specific key.

28. A computer program product as defined in claim 26, wherein the device-specific number comprises a serial number.

* * * * *